Feb. 18, 1969  J. R. BURKE  3,428,812
OPTICAL SPIN COMPENSATOR
Filed Oct. 22, 1965

INVENTOR
Joseph R. Burke
BY
ATTORNEYS

United States Patent Office 3,428,812
Patented Feb. 18, 1969

3,428,812
OPTICAL SPIN COMPENSATOR
Joseph R. Burke, Alexandria, Va., assignor to the United States of America as represented by the Administrator of the National Aeronautics and Space Administration
Filed Oct. 22, 1965, Ser. No. 502,740
U.S. Cl. 250—203       3 Claims
Int. Cl. G02b 17/00, 23/02

ABSTRACT OF THE DISCLOSURE

On a spinning satellite having a spatially stabilized directional radiation receiving axis, such stabilization accomplished by known despin techniques, means for rotating the received radiation at a precise rate which is synchronized to the rate of spin of the satellite so as to eliminate relative rotational motion between the received beam and a fixed sensor on the satellite so that radiation projected onto the sensing means is stationary with respect to the sensing means thereby enhancing clarity of reception.

---

The invention described herein may be manufactured and used by or for the government of the United States of America for governmental purposes without the payment of any royalties thereon or thereunder.

The present invention relates to the field of radiation receiving and more particularly to an optical scanner adapted to be mounted on a rotating body such as, for example, a space vehicle for receiving radiation from a distant relatively stationary object such as the earth, the moon, or any other desired object. Optical scanners have been in use for many years and have generally proven satisfactory when mounted on stationary supporting structures. However, the rapid advance of space technology has created a need for reliable optical scanners that function satisfactorily when mounted on a rotating supporting structure such as a space vehicle.

It is, accordingly, an object of this invention to provide an improved optical receiving means to be mounted on a rotating supporting structure.

Optical scanners have been supported in rotating bodies in the past. These rotating bodies such as earth satellites and the like have employed a variety of means for overcoming effects of the rotational movement of the supporting structure with respect to the object being scanned, namely by synchronization or despin techniques. For example, in satellites having electronic readout mechanisms, electronic synchronization circuitry has been employed to correlate the readout mechanism with the rotation of the supporting structure. That is, the readout mechanism is only operative during those portions of each of the satellite revolutions that it scans the object which is desired to be viewed. These structures, however, are somewhat complicated, and quite sensitive, and have not proven to be completely reliable. A good example of a prior art mechanical despin technique used to stabilize a directed beam is described in the U.S. Patent 3,341,151 to A. Kampinsky, filed July 23, 1965.

Another form of conventional scanning means is described in U.S. Patent 2,873,381 to T. J. Lauroesch. Therein a scanner is mounted on a fixed support and employs a first rotating mirror means for receiving and directing an image into a second rotating mirror arrangement, which directs the image into a photoelectric sensing means. However, the image directed into the photoelectric sensing means is moving with respect to the sensing means. This structure therefore does not provide as sharp an image upon readout as would be possible if the image projected into the sensing means were stationary with respect to the sensing means. The device of Lauroesch, for example, is intended to be mounted on a fixed supporting structure and would not function properly if mounted on a rotating support such as an earth satellite or other space vehicle. A primary reason for this is because any images received would be randomly received due to the rotation of the support means. Another disadvantage to the use of the Lauroesch type of device in satellites is that the rotation of the supporting structure would produce additional relative movement between the image projected into the photoelectric sensing means and the photoelectric sensing means structure. The rotation of the supporting structure would also reduce the length of time that any particular object could be scanned and this would obviously adversely affect the quality of the readout. This is particularly so when the object being scanned is dark or of such a nature that it does not emit a large amount of light, in which event a more sensitive scanning system is required.

Therefore, it is an object of this invention to provide a simple and reliable optical scanning means that can be mounted on a rotating supporting structure so as to continuously face the object being scanned. A structure of this type can then produce a sharp and distinct readout image from the photoelectric scanning means, because the image directed into the photoelectric sensing means has no movement with respect to the photoelectric sensor.

Another object of this invention is to provide an optical scanning means mounted upon a rotating supporting structure for directing the image of the object being viewed into a sensing means so that the directed image does not rotate with respect to the sensing means.

A further object of this invention is the provision of an optical scanning means for use in a rotating space vehicle wherein an image of the object being viewed is continuously received, derotated, and directed to a sensing means.

Still another object of this invention is to provide an optical scanning means mounted upon a rotating supporting structure with means for compensating for the rotation of the supporting structure so that the scanning means continuously faces the object being viewed and directs the image of the object being viewed into sensing means without any relative movement between the image and the sensing means structure.

In accordance with the principle of the invention a reflecting surface is mounted for rotation with respect to a satellite support structure, which support structure rotates with respect to a fixed point in space. A conventional sensing means senses the rate of rotation of the support and is operative in response to that rotation to control rotation of the reflecting surface so that it too rotates at the speed of the support but in the opposite direction. However, although the reflecting surface will always face the object being viewed, the image received will rotate with respect to the support. This relative rotation of the reflecting surface's image is removed by directing the image into a dove prism which is rotated at one half the angular rate of the support but in the opposite direction. In this manner the fixed point's image as it emerges from the dove prism is stationary with respect to the support whereby it may be conveniently directed into a photoelectric sensing means affixed to the support.

Other objects and many of the attendant advantages of this invention will be readily appreciated as the same become better understood by reference to the following detailed description when considered in connection with the detailed description and the accompanying drawings.

Figure 1:
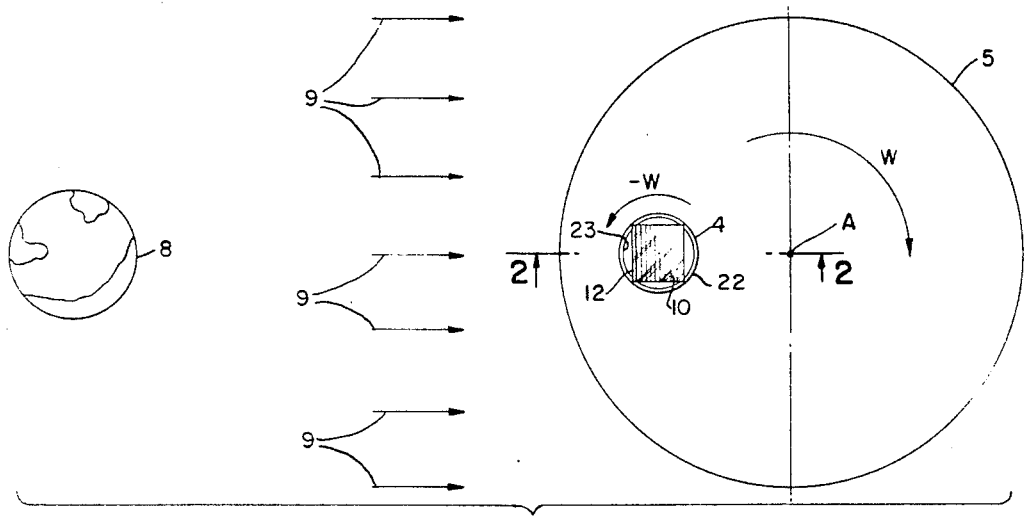
FIG. 1 is a generalized schematic illustration of the optical scanning means, its supporting structure, and an object being viewed by the scanning means.

The manner in which this invention operates will best be understood by referring to FIG. 1 of the drawings. The spin compensating optical scanning means 4 is shown mounted on a space vehicle or other rotating structure 5 which continuously rotates about a rotational axis A. The rotational axis A extends perpendicularly to the paper in FIG. 1 and the rotating support means rotates at an angular rate W. The purpose of the optical scanner is to receive the image of the object 8, which could be the earth, the moon, planets, stars, or any parts thereof, or any other desired object spaced a substantial distance from the scanning means. The supporting structure or space vehicle 5 could be of any desired configuration and is illustrated as being cylindrical solely for the purpose of better explaining the operation of the optical spin compensator. The object 8 being viewed is distant from the support means 5 and the distance could be in the order of hundreds or thousands of miles; accordingly, all light rays 9, impinging upon vehicle 5 from the object 8 are essentially parallel.

Figure 2:
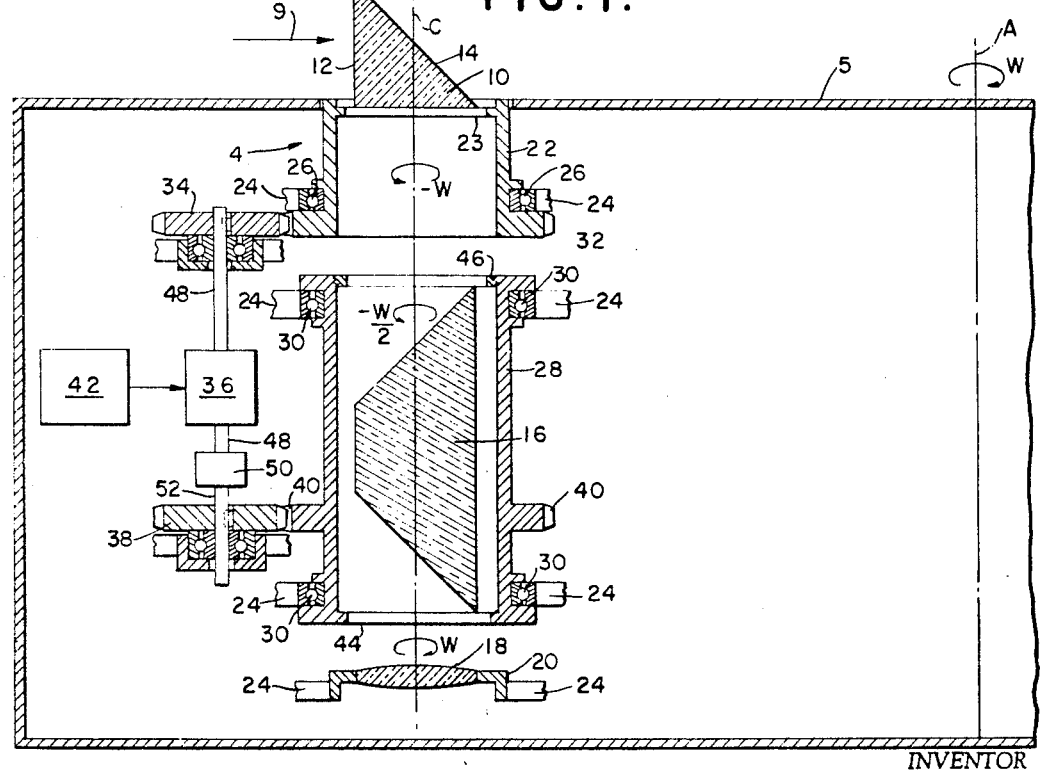
FIG. 2 is a partial sectional view taken along lines 2—2 of FIG. 1 and includes a partial schematic illustration of the drive means for the different rotating elements of the invention.

The opitcal scanning means is best illustrated in FIG. 2 and comprises a redirective diagonal prism 10 having an image receiving surface 12 and a reflecting surface 14. The light entering surface 12 is redirected by surface 14 along axis C, which is parallel to the axis of rotation A, and into a dove prism 16. The light rays emerge from the dove prism 16 and continue to follow a path parallel to axis C to enter the focusing lens 18 of a conventional radiation receiving sensing means 20. The sensing means 20 is any conventional structure capable of receiving an optical image and providing an output indicative of the nature of the received image. For example, sensing means 20 could be a television camera.

A prism supporting tube 22 is rotatably mounted by means of bearings 26 on a portion of a frame 24 which is affixed to the rotating support or space vehicle 5. The lower portion of support tube 22 has a driven gear means 32 formed integrally therewith and meshing with a driving gear 34 which is driven by means of a variable speed electric motor 36. Accordingly, it will be seen that actuation of the variable speed electric motor 36 serves to rotate support tube 22 and prism 10 with respect to the supporting structure 5. Prism 10 is fixedly supported in the supporting tube 22 by a circular ring 23 extending from the interior wall of the support tube 22. Conventional clamps or other means are used for attaching the prism to ring 23.

A second rotatable support tube 28 is mounted for rotation on bearings 30 attached to the frame 24. A gear 40 is formed integrally with tube 28 and extends from the outer surface of tube 28 to mesh with a second driving gear 38. In this manner rotation of the second driving gear 38 rotates tube 28. A dove prism 16 is fixedly mounted inside tube 28 by means of a circular ring 44 which is formed integrally with tube 28 to extend from the lower end of the inner wall of tube 28, and by a threaded ring 46 threadably connected to the top portion of the inner wall of tube 28. Other conventional means could also be used to fixedly attach dove prism 16 inside the tube support 28. The sensing means 20, which could be any conventional photo-sensitive device, is fixedly supported on frame 24 of supporting structure 5.

The electric motor 36 has a drive shaft 48 extending from both ends thereof and the first drive gear 34 is affixed to shaft 48. However, the other end of shaft 48 drives a 2:1 gear reduction transmission 50. The second drive gear 38 is mounted on the output shaft of the transmission 50 for rotation thereby. Variable speed motor 36 is controlled by spin sensing means 42. The spin sensing means 42 includes means responsive to the speed of rotation of the support vehicle 5 and causes motor 36 to run at a speed so that support tube 22 and prism 10 mounted thereon rotate at an angular rate equal to the angular rate of rotation of the supporting structure 5. However, tube 22 and its associated prism 10 are rotated in the opposite direction from the rotation of the supporting structure 5. The rotation of support tube 22 and its associated prism 10 is designated —W in FIG. 1. The means for sensing the rotational speed of the supporting means is conventional and well known to those skilled in the art and hence will not be further described.

Inspection of FIG. 1 of the drawings will show that the counterclockwise rotation —W of prism 10 with respect to the supporting structure 5 causes the image receiving surface 12 to always face the object being viewed so that surface 12 is always perpendicular to all light rays 9 received from object 8. However, the image directed from the bottom surface of prism 10 is rotating with respect to supporting structure 5.

The rotating dove prism 16 serves to stop the rotation of the image received from prism 10 in a manner which will now be described. It is well known that an image which is rotating relatively to a dove prism and which is directed into the dove prism emerges from the dove prism rotating at a speed equal to twice the relative speed of rotation of the directed image and the dove prism. Accordingly, dove prism 16 is rotated at an angular rate of —W/2 by means of gear 40, driving gear 38, transmission 50 and motor 36. Keeping these relationships in mind, it will be clear that the image emerges from dove prism 16 without any rotation with respect to the vehicle 5 or the sensing means 20. In summation, prism 10 emits an image that is rotating at —W with respect to vehicle 5. Since prism 16 is rotating in the same direction at half the speed of the image emitted from prism 10, the image from prism 10 rotates in clockwise direction at a rate W/2 with respect to prism 16. Since an image emitted from a dove prism rotates at twice the angular rate of the relative rotation between the entering image and the dove prism, the image emerging from dove prism 16 will be rotating at a rate W which is exactly equal to the angular rate of rotation of the vehicle 5. Consequently, there is no movement between the image and any portion of the vehicle 5.

While the preferred construction of this invention has been discussed above, it will be apparent that other conventional elements could be employed. For example, a diagonal mirror, a penta-prism, or any other similar device may be used to deviate a light beam from the viewed object rather than the diagonal prism 10. When a mirror is used in place of prism 10 it is easily made adjustable to vary the angle of the plane of the mirror with respect to axis C to receive light rays arriving at an angle other than perpendicular to axis C. In this manner the structure is adapted to scan even while the platform tumbles. Similarly, plural mirrors can be employed, in well known manner, in place of dove prism 16. Another practical modification is to use an inverted hemispherical mirror or equivalent prism to replace prism 10. These modifications, however, are optically more complicated than the preferred embodiment disclosed herein.

Various modifications are contemplated as discussed above and may obviously be resorted to by those skilled in the art without departing from the spirit and scope of this invention as hereinafter defined by the appended claims.

Having thus described the invention, what is claimed is:

1. In a satellite adapted to spin about an axis;
   spin sensing means responsive to the rate of spin of said spinning satellite, said spin sensing means generating an output representative of said rate of spin of said satellite;
   radiation receiving sensor means, said radiation receiving sensor means fixed to said spinning satellite;
   redirection means for receiving external radiation, said redirection means rotatable about an axis parallel to the spin axis of said spinning satellite, said redirection means continuously redirecting received external radiation in an output beam toward said radiation receiving sensor means, said output beam having a rotation with respect to said radiation receiving sensor;

drive means, said drive means responsive to said spin sensing means output for rotating said redirection means at substantially the same angular rate in the opposite direction as the spin of said satellite;

the improvement comprising, beam rotation means interposed in said output beam between said redirection means and said radiation receiving sensor means, said beam rotation means interconnected and responsive to said spin sensing means thereby modifying the rate of rotation of said output beam with respect to said radiation receiving sensor means.

2. The satellite of claim 1 wherein said beam rotation means is caused to rotate in the same direction at one half the rate of rotation of said redirection means whereby radiation projected onto said radiation receiving sensing means is stationary with respect to said radiation receiving sensing means, thereby enhancing clarity of reception.

3. The satellite of claim 2 wherein said beam rotation means is a dove prism.

References Cited

UNITED STATES PATENTS

| | | | |
|---|---|---|---|
| 815,657 | 3/1906 | Swasey | 350—23 |
| 1,209,958 | 12/1916 | Graul | 350—23 |
| 2,216,031 | 9/1940 | Bennett | 350—22 |
| 2,873,381 | 2/1959 | Lauroesch | 250—236 |
| 2,939,962 | 6/1960 | Miller | 250—236 |
| 3,061,730 | 10/1962 | Jankowitz | 250—203 |
| 3,099,748 | 7/1963 | Weiss | 350—7 |
| 3,341,151 | 9/1967 | Kampinsky | 244—155 |
| 959,013 | 5/1910 | Howell | 350—7 |

DAVID SCHONBERG, *Primary Examiner.*

P. R. GILLIAM, *Assistant Examiner.*

U.S. Cl. X.R.

350—7, 23, 236